United States Patent [19]

Shionozaki et al.

[11] Patent Number: 4,629,290

[45] Date of Patent: Dec. 16, 1986

[54] LIQUID CRYSTAL COMPOUNDS AND METHOD OF PREPARATION

[75] Inventors: Yoshio Shionozaki; Hiroshi Mukai, both of Suwa, Japan

[73] Assignee: Seiko Epson Kabushiki Kaisha, Tokyo, Japan

[21] Appl. No.: 592,497

[22] Filed: Mar. 22, 1984

[30] Foreign Application Priority Data

Mar. 22, 1983 [JP] Japan .................................. 58-47737
Aug. 5, 1983 [JP] Japan .................................. 58-122026

[51] Int. Cl.$^4$ .......................... G02F 1/13; C09K 3/34; C07C 105/00
[52] U.S. Cl. .......................... 350/350 R; 252/299.66; 252/299.67; 252/299.68; 350/333; 534/566; 534/572
[58] Field of Search .................. 252/299.66, 299.67, 252/299.68; 350/350 R, 333; 534/566, 572

[56] References Cited

U.S. PATENT DOCUMENTS

| 3,975,286 | 8/1976 | Oh ............................. | 252/299.67 |
| 4,009,908 | 3/1977 | Yamazaki et al. ............. | 252/299.67 |
| 4,011,173 | 3/1977 | Steinstrasser ................. | 252/299.67 |

FOREIGN PATENT DOCUMENTS

| 2359777 | 6/1974 | Fed. Rep. of Germany ................... | 252/299.67 |
| 50-70287 | 6/1975 | Japan ............................ | 252/299.68 |
| 53-42189 | 4/1978 | Japan ............................ | 252/299.67 |
| 53-95886 | 8/1978 | Japan ............................ | 252/299.67 |
| 53-105436 | 9/1978 | Japan ............................ | 252/299.68 |

OTHER PUBLICATIONS

Gray et al., Electronics Letters, vol. 9, No. 26, pp. 616–617 (1973).
Dabrowski, R. et al., Mol. Cryst. Liq. Cryst., vol. 61, pp. 61–78 (1980).
Demus, D. et al., Flussige Krystalle in Tabellen, Veb Deutscher Verlag fur Grundstoffindustrie, Leipzig, p. 165 (1974).
Shashidhara Prasad, J., et al, Liquid Crystals & Ordered Fluids, vol. 4, pp. 673–686, Plenum Press, N.Y. (1984).
Shivaprakash, N. C., et al., Mol. Cryst. Liq. Cryst., vol. 74, pp. 215–226 (1981).
Van der Veen, J. et al, Mol. Cryst. Liq. Cryst., vol. 17, pp. 291–301 (1972).
Okubo, M. et al., Bull. Chem. Soc. Jpn., vol. 56, pp. 199–202 and pp. 203–207 (1/83).
Okubo, M. et al., Bull. Chem. Soc. Jpn., vol. 53, pp. 281–282 (1/80).
Okubo, M. et al., Bull. Chem. Soc. Jpn., vol. 54, pp. 2337–2340 (8/81).

Primary Examiner—Teddy S. Gron
Attorney, Agent, or Firm—Blum Kaplan Freidman Silberman & Beran

[57] ABSTRACT

Asymmetric trans-4,4'-dialkyl-ONN-azoxybenzenes having the general formula:

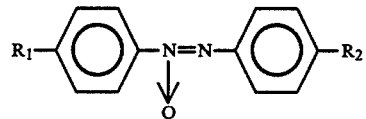

wherein $R_1$ and $R_2$ are straight-chain alkyl groups having from 1 to 10 carbon atoms and $R_1 \neq R_2$ are provided. The azoxybenzene compounds are prepared by condensing corresponding P-alkylaniline

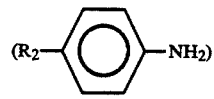

and P-alkylnitrobenzene

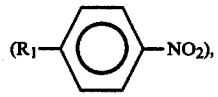

placing the reaction mixture into ammonium chloride and hydrolyzing to yield the asymmetrical azoxybenzene compound, corresponding asymmetrical azobenzene compound and asymmetric azobenzene compound. The asymmetric azoxy compound is then separated from the mixture by column chromotography and recrystallization. The asymmetric azoxybenzene compounds have a wide range of nematic liquid crystal temperature and are particularly well suited for liquid crystal compositions for use in matrix-addressing driving systems.

20 Claims, 5 Drawing Figures

LIQUID CRYSTAL COMPOUNDS AND METHOD OF PREPARATION

BACKGROUND OF THE INVENTION

This invention relates to azoxybenzene compounds and a method for preparation, and more particularly to asymmetric trans-4-4'-N-dialkyl-ONN-azoxybenzene compounds.

Liquid crystal display devices have many advantages over a luminesence-type display. The liquid crystal display unit including the driver circuit is small and flat, can be driven at low voltage by a small power source and provide a visual display which is far superior to the luminescence-type display. In view of these advantages, liquid crystal display devices have become widely used for computer terminals, POS terminals, video displays and the like in place of conventional cathode ray tubes.

Liquid crystal materials used in liquid crystal display cells are generally of the nematic type. A matrix-addressing driving system for a twisted nematic liquid crystal display device (hereinafter referred to as the TN-LCD) is considered promising to increase the advantages of the liquid crystal display devices. New liquid crystal materials having suitable characteristics for such TN-LCD devices are highly desirable.

In order to provide a high-quality display of the TN-LCD driven by a matrix-addressing driving method, the dynamic characteristics of the liquid crystal material used must be improved. Specifically, the property of the steepness of the threshold of the voltage-contrast characteristic is significant. The steepness of threshold is expressed by $\beta$ wherein $\beta = V_{sat}/V_{th}$. This relationship is shown in FIG. 1. The smaller the value of $\beta$, the more suitable the liquid crystal material is for a matrix-addressing-driving method.

The steepness characteristic varies with the construction of the display device, such as the alignment treatment of the panels. However, the property which affects the display most significantly is the steepness $\beta$. It is also well known that if the value $K_{33}/K_{11}$, wherein $K_{11}$ and $K_{33}$ are the spray and bend elastic constants, respectively, which acts on the interaction of the liquid crystal molecules is small, the steepness $\beta$ is also small. See, Takahashi, Uchida, Electronic COmmunication Society of Japan, Research Report, vol. 80, No. 120, pp. 13-18, 1980.

In general, all liquid crystal compositions used in conventional TN-LCD are compounds having at least one of the following general formulae as the basic material thereof:

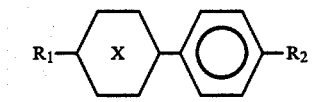
(a)

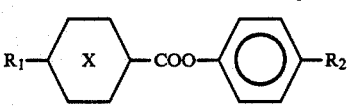
(b)

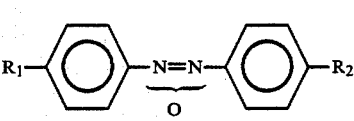
(c)

wherein $R_1$ and $R_2$ are straight-chain alkyl or alkoxy groups and

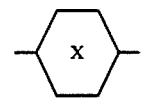

is a phenyl, cyclohexyl or pyrimidine ring or a dioxane ring. Representative compounds of formulas (a), (b) and (c) have the following general formulae:

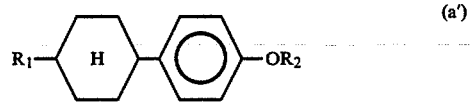
(a')

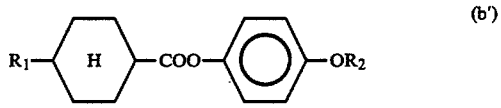
(b')

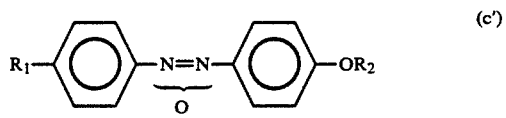
(c')

wherein $R_1$ and $R_2$ are straight-chain alkyl groups.

In order to observe the steepness $\beta$, each of the materials (a'), (b') and (c') a base liquid crystal material was prepared. Each base liquid crystal material was formed by mixing two compounds of each formula wherein $R_1$ and $R_2$ were n-$C_3H_7$ and n-$C_4H_9$, respectively, and n-$C_4H_9$ and n-$C_4H_9$, respectively in a 1:1 molar ratio. To 90 weight percent of the mixture, the following additional compounds were added to yield compositions (a''), (b'') and (c'').

| ADDITIONAL COMPOUNDS | MIXING RATE (WT %) |
|---|---|
| n-$C_2H_5$—⌬—COO—⌬—CN | 5 |
| n-$C_4H_9$—⌬—COO—⌬—CN | 5 |
| $CH_3CH_2CHCH_2O$—⌬—⌬—CN<br>　　　　｜<br>　　　$CH_3$ | 0.3 |

Thus, the total percentage for each crystal is 100.3%.

Each of the compositions (a''), (b'') and (c'') were sealed in a TN-type liquid crystal cell having a 6 μm thickness. The electrooptical properties, particularly the threshold voltage $V_{th}$, and the steepness $\beta$ were examined upon application of 100 Hz alternating voltage, static driving at a temperature of 20° C. The results were as set forth in the following Table I.

TABLE 1

| basic compound | Vth(V) | β |
|---|---|---|
| a'' $R_1$—⌬H⌬—⌬—$OR_2$ | 2.0 | 1.33 |

TABLE 1-continued

| basic compound | | Vth(V) | β |
|---|---|---|---|
| b" | 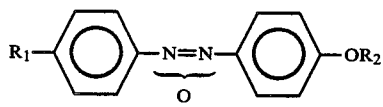 | 2.28 | 1.26 |
| c" | 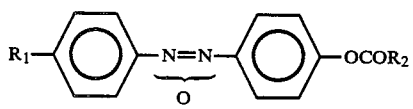 | 2.17 | 1.18 |

As shown in Table 1, the relative steepness β is (a")>(b")>(c"). Based on this, it can be seen that the steepness for compounds having polar bonding groups, such as —COO—, or

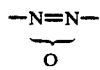

in a liquid crystal composition is greater than that for compounds without the polar bonding groups. It is believed that the interaction of the pliable polar bonding groups and the liquid crystal molecules reduces the value of the ratio $K_{33}/K_{11}$. When comparing the two polar bonding groups, the effect of lowering the value of the ratio of $K_{33}/K_{11}$ is greater for a compound having an azoxy group,

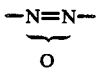

than for a compound having a carbonyl group, —COO—. Accordingly, the steepness of compounds including the azoxy group is more suitable for the TN-LCD rather than the carbonyl group, which is confirmed by the results set forth in Table 1.

Based on the above, a liquid crystal material with excellent steepness which was considered most suitable for matrix-addressing driving method was considered to be a compound having

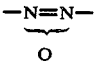

bonding, that is an azoxybenzene compound. However, conventional azoxybenzene compounds have presented difficulties. For example, 4-alkoxy-4'-alkylbenzene having the general formula:

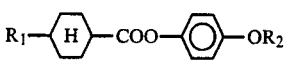

or a 4-acyloxy-4'-alkylazoxybenzene having the general formula:

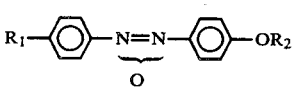

are known to be degraded by light, particularly with respect to resistivity. Moreover, these azoxybenzene compounds are colored by light. Consequently, in order to protect them it is necessary to use the yellow filter having a 480 nm absorption edge.

As another example, an isomer admixture of 4,4'-dialkylazoxybenzene having the general formula:

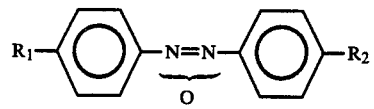

in symmetrical form wherein $R_1=R_2$ and in the asymmetrical form wherein $R_1\neq R_2$ admixed with the asymmetrical form wherein $R_1\neq R_2$ is disclosed in U.S. Pat. No. 3,907,768 and Dabrowski, Mol. Cryst. Liq. Cryst., 1980, Vol. 61, pp. 61–78.

The various azoxybenzene compounds disclosed in these references may be obtained by the following reaction schemes.

Scheme 1

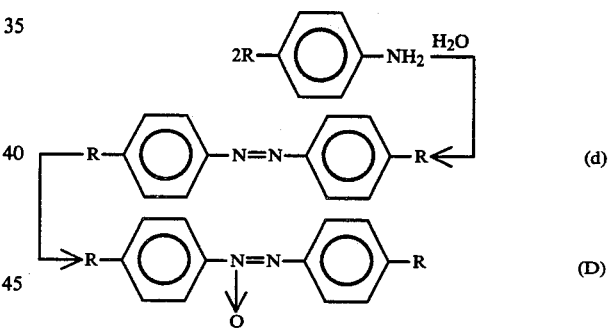

Scheme 2

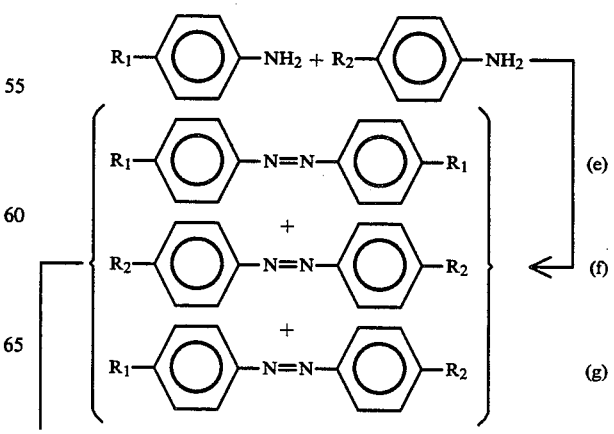

-continued

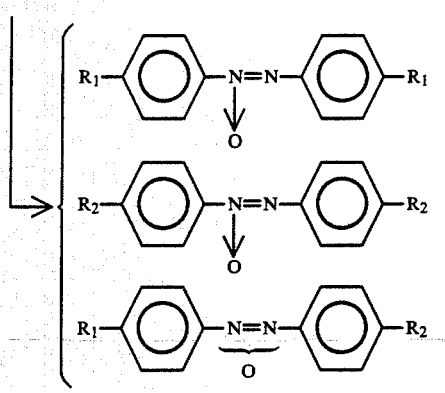

Scheme 3

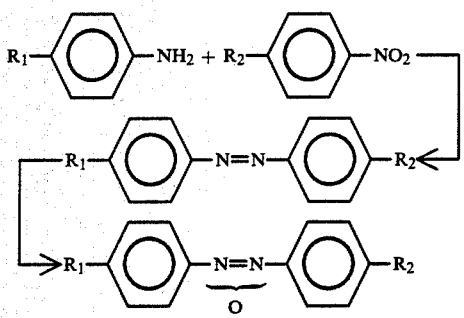

As shown by Scheme 1, two molar equivilents of P-alkylaniline are oxidized to yield an azo compound (d) and by oxidizing the azo compound (d), asymmetrical azoxy compound (D) is obtained. Scheme 2 and Scheme 3 yield asymmetrical azoxy compounds. In Scheme 2, two types of P-alkylaniline having different alkyl groups are treated in the same manner as in Scheme 1. An asymmetrical azoxy compound (G) admixed with two types of symmetrical azoxy compounds (E) and (F) are obtained. It is almost impossible to separate the asymmetrical azoxy compounds (G) from the resulting mixture.

Under Scheme 3, P-alkylaniline and P-alkylnitrosobenzene having different alkyl groups are oxidized to yield an azo compound (h). Then, the azo compound (h) is oxidized and an asymmetrical azoxy compound (H) is obtained. However, the nitroso compounds are easily reduced so that $R_2$ is limited to only methyl or ethyl.

Under both Scheme 2 and Scheme 3, the asymmetrical azoxy compound inevitably includes two isomers wherein the coordination of oxygen is different. In other words, 4,4'-dialkyl-ONN-azoxybenzene and 4,4'-dialkyl-NNO-azoxybenzene having the following formulae, respectively are obtained:

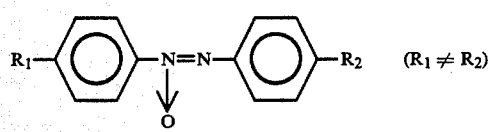

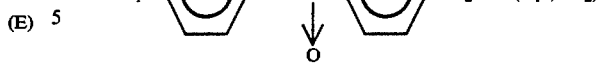

Again, it is not possible to separate one of the asymmetrical isomers from the mixture. Similarly, in the case of forming azoxy compounds by oxidizing an azobenzene compound, the following isomers are formed, namely 4-alkoxy-4'-alkylazoxybenzene and 4-acyloxy-4'-alkylazoxybenzene.

The liquid crystal properties of the above symmetrical and asymmetrical azoxy compounds as reported in the above references are shown in Table 2 and Table 3, respectively. In each of the tables the following notation controls:
S/N: Smectic-Nematic transition temperature,
N-I: Nematic-Isotropic transistion temperature,
S-I: Smectic-Isotropic transistion temperature,
value in parenthesis: monotropic value, and
value with mark *: data from U.S. Pat. No. 3,907,768.

TABLE 2

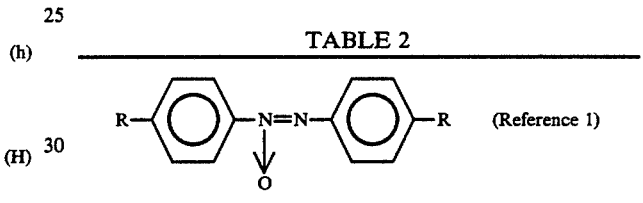

| R | mp (°C.) | N ⇌ I (°C.) | S/N$^{(a)}$, S ⇌ I$^{(b)}$ (°C.) |
|---|---|---|---|
| n-C$_3$H$_7$ | 65~66 | 60 | |
| n-C$_4$H$_9$ | 18 | 27 | |
| n-C$_5$H$_{11}$ | 21~22 | 71.5~72 | |
| n-C$_6$H$_{13}$ | 20~21 | 47.5~48 | |
| n-C$_7$H$_{15}$ | 33~34.5 | 70~71 | (55)$^{(a)}$ |
| n-C$_8$H$_{17}$ | 38~39.5 | 67 | (66)$^{(a)}$ |
| n-C$_9$H$_{19}$ | 45~45.5 | | 77.5$^{(b)}$ |
| n-C$_{10}$H$_{21}$ | 50.5~51.5 | | 77.5$^{(b)}$ |

TABLE 3

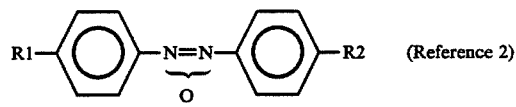

| R1 | R2 | mp (°C.) | S/N (°C.) | N ⇌ I (°C.) |
|---|---|---|---|---|
| CH$_3$ | CH$_3$ | 70 | | (38) or 69.8 |
| C$_2$H$_5$ | " | 40~47 | | (31) |
| n-C$_3$H$_7$ | " | 6~7 | | 0.5 |
| n-C$_4$H$_9$ | " | 24.5~27 | | 28.5 |
| n-C$_5$H$_{11}$ | " | 18~22.5 | | 53.5 |
| n-C$_6$H$_{13}$ | " | 24.5~25.5 | | 42.5 |
| n-C$_7$H$_{15}$ | " | 31~32 | | 56 |
| n-C$_8$H$_{16}$ | " | 26~27.5 | | 51 |
| n-C$_9$H$_{19}$ | " | 34.5~35.5 | | 60 |
| n-C$_{10}$H$_{21}$ | " | 32~34 | (25.5) | 57.5 |
| C$_2$H$_5$ | C$_2$H$_5$ | 23~23.5 | | |
| n-C$_3$H$_9$ | " | 13.5~14 | | 33 |
| | | 16* | | 35* |
| n-C$_4$H$_9$ | " | 16.5 | | (12) |
| | | 13* | | 18* |
| n-C$_5$H$_{11}$ | " | 5 | | 40.5 |
| | | 10* | | 41* |
| n-C$_6$H$_{13}$ | " | 9.5 | | 31.5 |
| | | 11* | | 31* |
| n-C$_7$H$_{15}$ | " | 8 | | 45 |

TABLE 3-continued

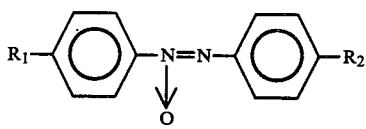

(Reference 2)

| R1 | R2 | mp (°C.) | S/N (°C.) | N ⇌ I (°C.) |
|---|---|---|---|---|
| n-C$_8$H$_{17}$ | " | 10.5 | (2) | 42 |
| n-C$_9$H$_{19}$ | " | 19.7 | 23 | 49.5 |
| n-C$_{10}$H$_{21}$ | " | 24.0 | 26.5 | 47.5 |

As is shown in Table 2 with respect to the symmetrical azoxybenzene compounds, those compounds wherein the alkyl group R is pentyl or hexyl present a fairly suitable range of nematic liquid crystal temperature. On the other hand, the other compounds do not present such a range of nematic liquid crystal temperature, or if present, the range is substantially narrow due to the appearance of the smectic phase.

As shown in Table 3, some of the asymmetrical isomers have fairly suitable liquid crystal properties. Among those, compounds wherein R$_2$ is methyl or ethyl are not desirable. This is due to the above noted effect of polar bonding groups on the molecules which effect $K_{33}/K_{11}$. R$_1$ and R$_2$ must have a minimum number of carbon atoms. It has been shown experimentally that the larger the number of total carbon atoms there is, the smaller is the value of $K_{33}/K_{11}$.

In all cases, the conventional methods for preparing azoxybenzene compounds present many problems. The pure compound is difficult to obtain or the properties of the compound are not reproducable because of unavoidable production of isomers or the presence of isomers in the product. Additionally, it is difficult to obtain specific proportions of symmetrical compounds or compounds having specific alkyl groups. Thus, it has not been possible to obtain the liquid crystal compositions of excellent properties as had been expected.

Accordingly, it is desirable to provide improved asymmetric azoxybenzene compounds having excellent dynamic properties while avoiding the above-mentioned problems in the prior art.

SUMMARY OF THE INVENTION

Asymmetric azoxybenzene compounds, namely trans-4,4'-di-alkyl-ONN-azoxybenzene having the general formula:

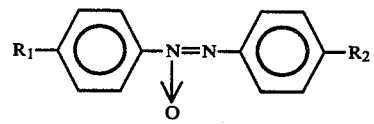

wherein R$_1$ and R$_2$ are straight-chain alkyl groups having from 1 to 10 carbon atoms and R$_1 \neq$R$_2$ are provided. The asymmetric azoxybenzene compounds are prepared by condensing an arylaminodimagnesium with P-alkylnitrobenzene to yield a mixture of azo compounds and asymmetrical azoxy compound. The azoxy compound is separated from the azo compounds by column chromotography and recrystallization.

The asymmetric azoxy compounds prepared in accordance with the invention present a wide range of nematic liquid crystal temperatures compared to conventional symmetric azoxy compounds. These azoxy compounds have crystal-nematic transistion temperatures which are less than normal temperature and nematic-isotropic liquid transistion temperatures which are higher than normal temperature. Thus, the azoxy compounds are particularly well suited for liquid crystal display devices utilized at room temperature. The compounds have excellent dynamic properties, improved visual angle dependence, steepness, improved light-resistivity and are particularly well suited for use in a liquid crystal display device driven by the matrix-addressing driving method.

Accordingly, it is an object of the invention to provide improved liquid crystal compounds.

It is another object of the invention to provide improved liquid crystal compounds which can be utilized as base materials to be used in a TN-LCD driven by a matrix-addressing driving method.

A further object of the invention is to provide a method for preparing asymmetric azoxybenzene liquid crystal compounds without producing undesirable residium or mixing with an isomer.

Still another object of the invention is to provide high-quality TN-LCD display driven by a matrix-addressing driving method.

Still a further object of the invention is to provide trans-4-4'-dialkyl-ONN-azoxybenzene having the general formula:

R$_1$—⟨◯⟩—N=N—⟨◯⟩—R$_2$
         ↓
         O wherein R$_1$ and R$_2$ are straight-chain alkyl groups having from 1 to 10 carbon atoms and R$_1 \neq$R$_2$.

Still other objects and advantages of the invention will in part be obvious and will in part be apparent from the specification.

The invention accordingly comprises the several steps and the relation of one or more of such steps with respect to each of the others, and the composition possessing the features, properties, and the relation of constituents which are exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
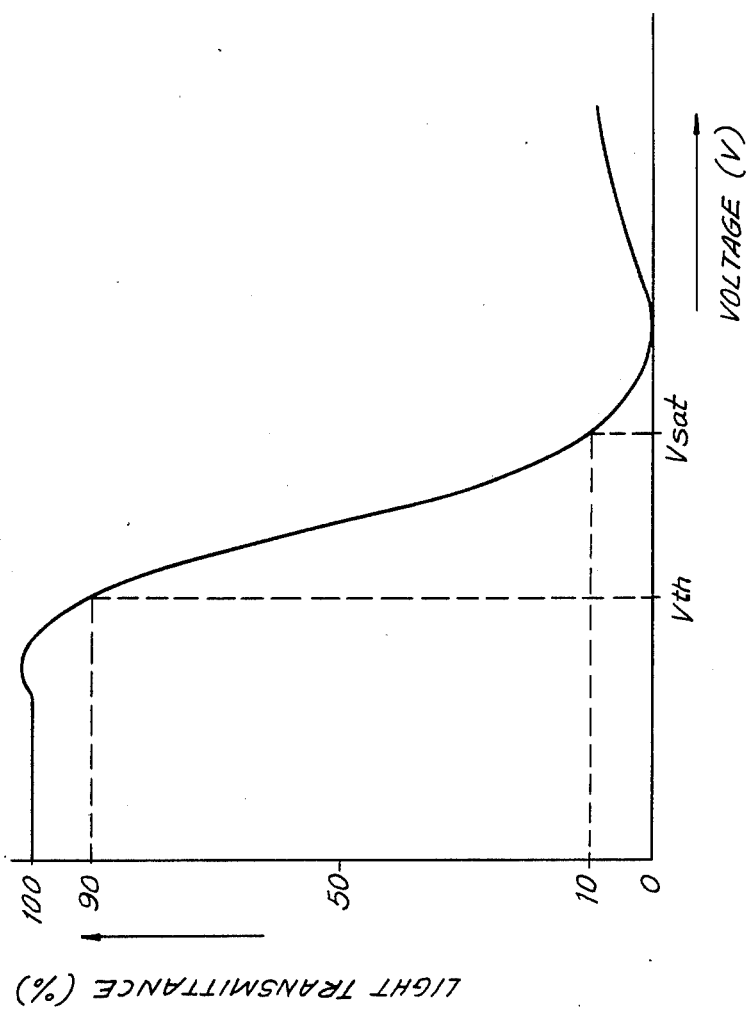
FIG. 1 is a cruve illustrating the voltage-contrast characteristic of a TN-liquid crystal display device.

The asymmetric azoxybenzene compounds in accordance with the invention are trans-4,4'-dialkyl-ONN-azoxybenzene having the general formula:

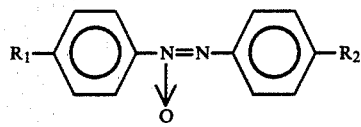

wherein $R_1$ and $R_2$ are straight-chain alkyl groups having from 1 to 10 carbon atoms and $R_1 \neq R_2$. These azoxybenzene compounds are prepared in accordance with the following procedure.

According to the literature (Masao Okubo, Journal of Synthetic Organic Chemistry, Japan, Vol. 40, No. 9, pp. 844, 845, September 1982), aryliminodimagunesium [ArN(MgBr)$_2$, hereinafter referred to as Ar-IDMg] is prepared from ethyl magnesium and P-R$_3$-aniline. The Ar-IDMg is condensed with P-R$_4$-nitrobenzene to yield a mixture of an asymmetric azoxy compounds and mixed azo compounds. The literature does not teach how to separate the asymmetric azoxy compound from the mixture which includes $R_3$ and $R_4$ groups of methyl and methoxy or methoxy and halogen.

In the following three step procedure the azoxybenzene compounds in accordance with the invention are separated from a reaction mixture of an azoxy compound and azo compounds by column chromotography and recrystallization. The reaction mechanism of this synthesis in accordance with the invention is illustrated below with a brief description of each step:

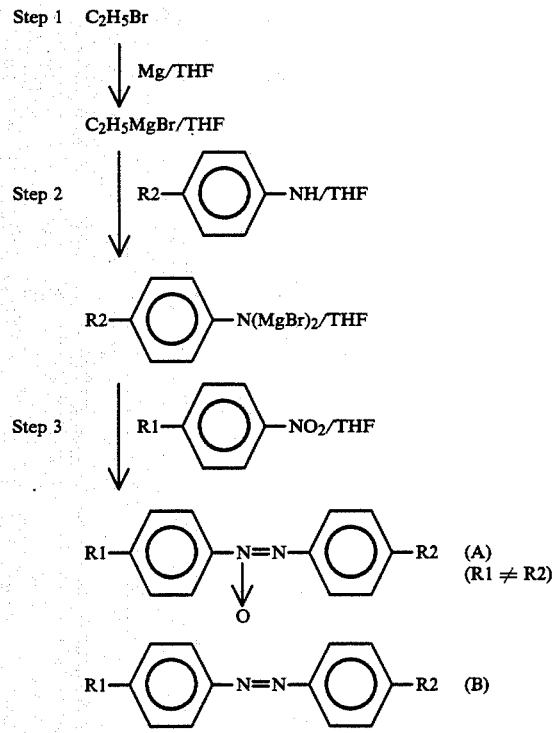

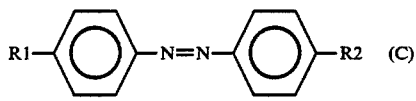

In Step 1, in a nitrogen atmosphere ethyl bromide (C$_2$H$_5$Br) is dripped into magnesium dispersed in tetrahydrofuran (THF) to provide the Grignard Reagent, ethylmagnesiumbromide (C$_2$H$_5$MgBr).

Under Step 2 the Grignard Reagent is refrigerated and stirred while a solution of P-alkylaniline

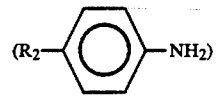

in THF is added. At this time ethane is produced and removed from the system. When the ethane production under refrigeration ceases, the reagent is heated to 50° C. under stirring until ethane production at the elevated temperature stops thereby resulting in the aryliminodimagnesium(ArN(MgBr)$_2$),Ar/IDMg).

In Step 3, the Ar-IDMg is refrigerated and stirred and a solution of P-alkylnitrobenzene

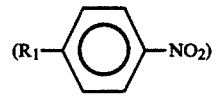

in THF is added slowly. The solution is maintained at a temperature of 55° C. for three hours to complete the reaction. After the reaction is completed, the reaction solution is added to a saturated ammonium chloride solution and the mixture is hydrolized. The resulting organic layer is washed with water and condensed. The residue contains three compounds, that is the asymmetric azoxy compound (A), an asymmetric azo compound (B) and a symmetric azo compound (C). The azoxy compound (A) is separated from the mixture of the three compounds by column chromatography and recrystallization.

The asymmetric azoxy compounds prepared in accordance with this method provided a wide range of nematic liquid crystal temperatures compared with symmetric azoxy compounds. A comparison of these temperatures is set forth in Table 4 below. Additionally, most of the azoxy compounds prepared in accordance with the invention have crystal-nematic transistion temperatures which are less than room temperature and nematic-isotropic liquid transition temperatures which are higher than room temperature. Thus, as most TN-liquid crystal display devices are used at about room temperatures, the azoxy compounds prepared in accordance with the invention are extremely suitable for such devices.

The azoxy compound in accordance with the invention also have excellent dynamic properties, such as $\alpha$: visual angle dependence; $\beta$: steepness, $\gamma$:$\alpha$·$\beta$. These are demonstrated in the examples below. Additionally, the light-resistivity of the azoxy compounds in accordance with the invention is also improved. If a light yellow filter having a 480 nm absorption edge is used, the light-resistivity is greater than that of conventional compounds utilizing the filter. When using such a filter, the quality of the display including the azoxy compounds in accordance with the invention are no lower than that of other types of display devices wherein the filter is not used. This effect is also shown in the Examples.

As noted above, 4,4'-dialkyl-ONN-azoxybenzenes in accordance with the invention are particularly well suited for a liquid crystal display device driven by the matrix-addressing driving method. It goes without saying that by including the azoxy compounds in accordance with the invention in various conventional liquid crystal display devices, the efficiency of such devices are enhanced.

The azoxy compounds in accordance with the invention will be described in more detail in the following examples, including methods of preparation, application and reliability of the compound in display devices. These examples are set forth for purposes of illustration only, and are not intended in a limiting sense.

EXAMPLE 1

Step 1. In a nitrogen atmosphere, 21.0 g of ethylbromide was added to 4.7 g of magnesium scraps in 200 ml of THF to yield ethylmagnesium bromide, (the Grignard Reagent).

Step 2. The Grignard Reagent was refrigerated and stirred while 40 ml of THF having 16.1 g of P-n-pentylaniline dissolved therein was added. When production of ethane under refrigeration ceased, the reaction solution was heated to 50° C. and maintained at that temperature under stirring until production of ethane under heating stopped. The resulting product was AR-IDMg.

Step 3. The AR-IDMg was refrigerated and stirred while 50 ml of THF having 11.9 g of P-n-hexylnitrobenzene dissolved therein was added. After addition was complete, the reaction solution was maintained at a temperature of about 55° C. for three hours. The reaction solution was added to saturated ammonium chloride solution and the mixture was hydrolized.

Figure 2:
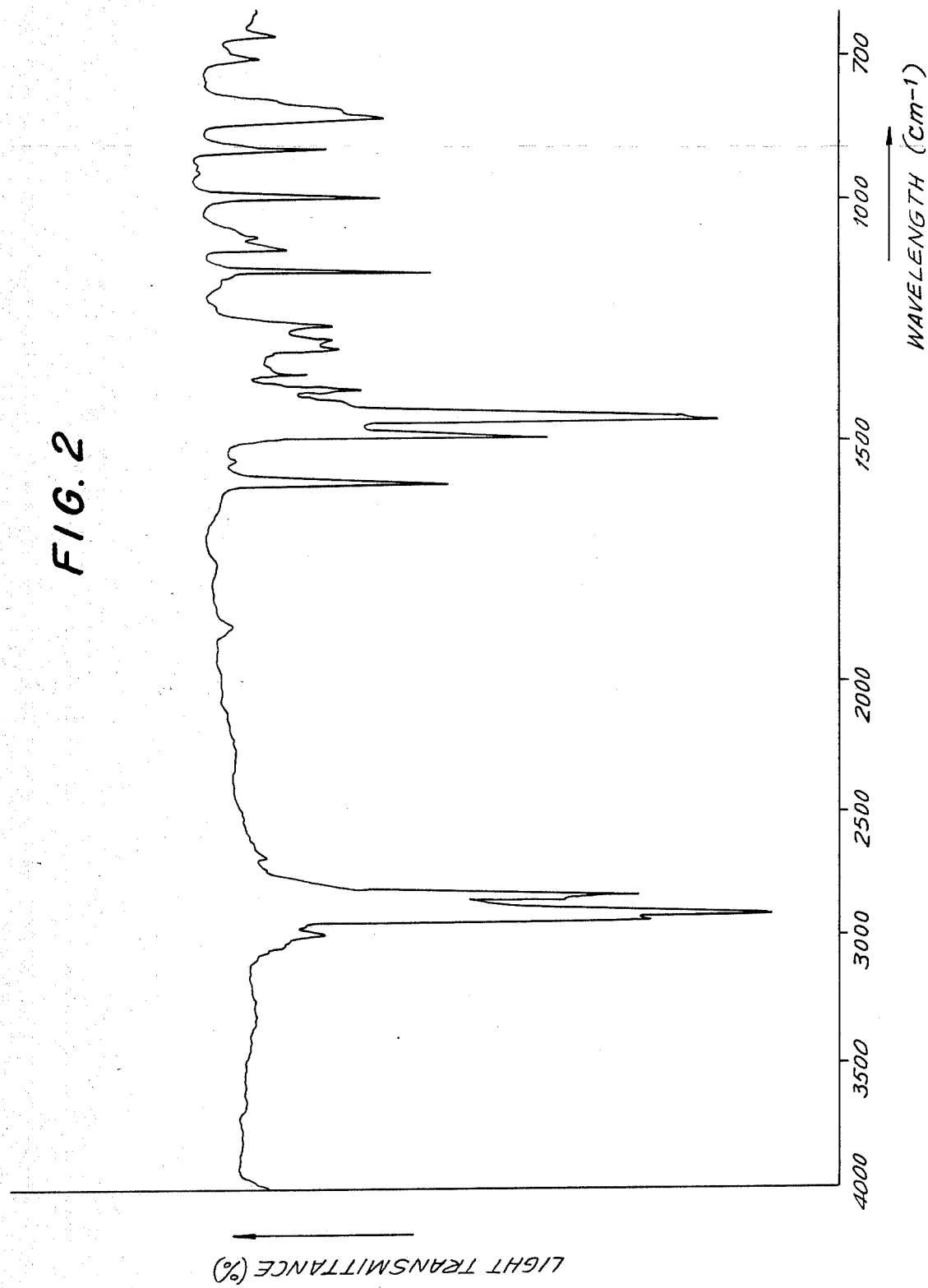
FIG. 2 is the infrared absorption spectrum of the compound, trans-4-hexyl-4'-N-pentyl-ONN-azoxybenzene in accordance with the invention.

The resulting organic layer was washed with water and condensed. The residue was refined by column chromotography to yield an acetone-methanol solution from which trans-4-n-hexyl-4'-n-pentyl-ONN-azoxybenzene was recrystallized. The quantity of crystals obtained weighed 11.0 g. The infrared absorption spectrum of this azoxybenzene compound is shown in FIG. 2.

EXAMPLE 2

Figure 3:
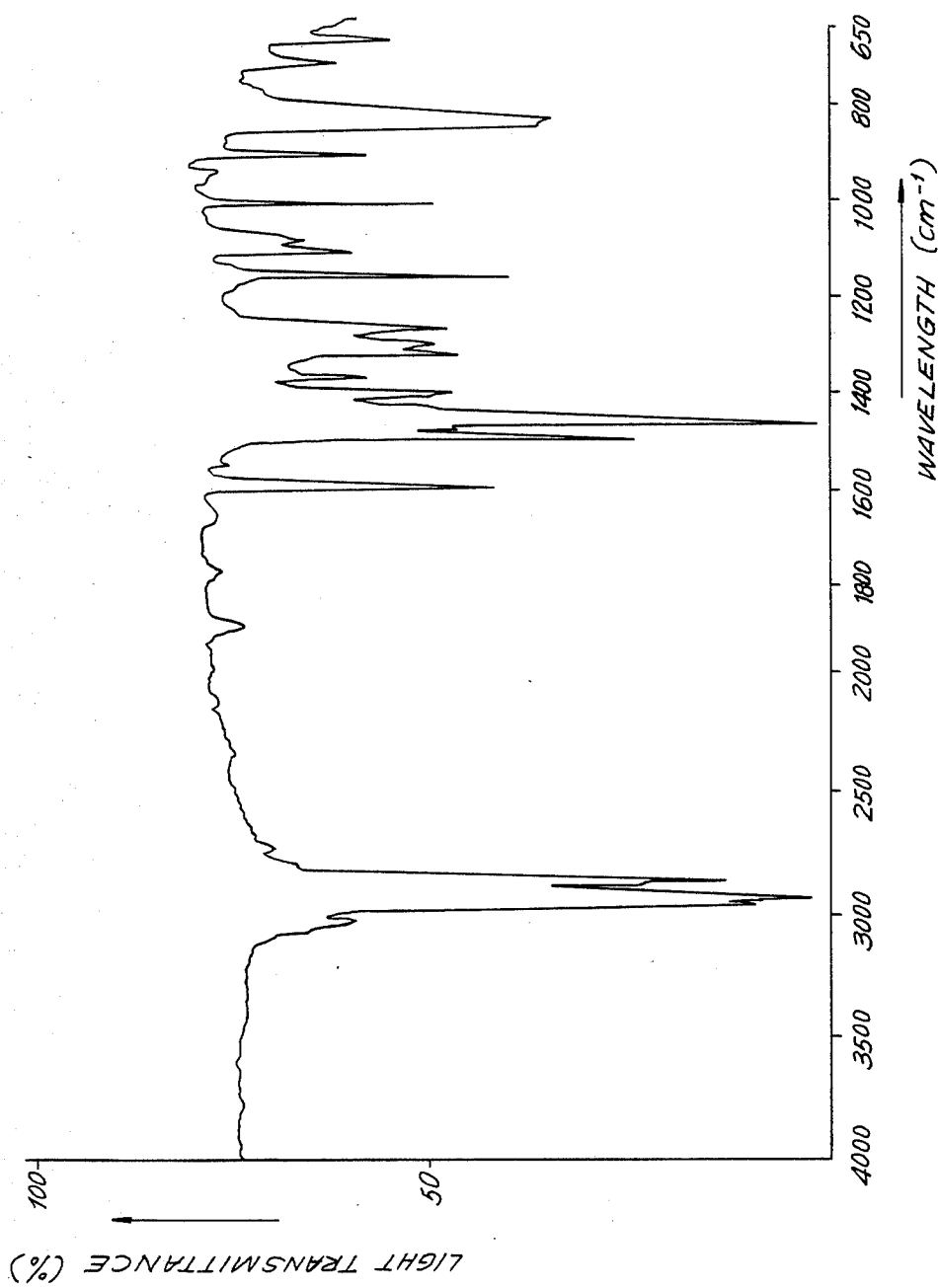
FIG. 3 is the infrared absorption spectrum of the compound, trans-4-ethyl-4'-N-propyl-ONN-azoxybenzene in accordance with the invention.

The procedures of Example 1 were reproduced except that in Step 2, 13.3 g of P-n-propylaniline was added to the refrigerated Grignard Reagent and in Step 3, 8.68 g of P-ethylnitrobenzene was added to the refrigerated AR-IDMg. The resulting azoxybenzene was trans-4-ethyl-4'-n-propyl-ONN-azoxybenzene crystals weighing 8.7 g. The infrared absorption spectrum of this azoxy benzene is shown in FIG. 3.

EXAMPLES 3–42

The procedures of Example 1 were followed to prepare the following azoxybenzene compounds from the corresponding P-n-alkylaniline and P-n-alkylnitrobenzenes:

| Example | Azoxybenzene |
| --- | --- |
| 3 | trans-4-ethyl-4'-n-butyl-ONN—azoxybenzene |
| 4 | trans-4-ethyl-4'-n-pentyl-ONN—azoxybenzene |
| 5 | trans-4-ethyl-4'-n-hexyl-ONN—azoxybenzene |
| 6 | trans-4-ethyl-4'-n-heptyl-ONN—azoxybenzene |
| 7 | trans-4-ethyl-4'-n-octyl-ONN—azoxybenzene |
| 8 | trans-4-propyl-4'-n-ethyl-ONN—azoxybenzene |
| 9 | trans-4-propyl-4'-n-butyl-ONN—azoxybenzene |
| 10 | trans-4-propyl-4'-n-pentyl-ONN—azoxybenzene |
| 11 | trans-4-propyl-4'-n-hexyl-ONN—azoxybenzene |
| 12 | trans-4-propyl-4'-n-heptyl-ONN—azoxybenzene |
| 13 | trans-4-propyl-4'-n-octyl-ONN—azoxybenzene |
| 14 | trans-4-butyl-4'-n-ethyl-ONN—azoxybenzene |
| 15 | trans-4-butyl-4'-n-propyl-ONN—azoxybenzene |
| 16 | trans-4-butyl-4'-n-pentyl-ONN—azoxybenzene |
| 17 | trans-4-butyl-4'-n-hexyl-ONN—azoxybenzene |
| 18 | trans-4-butyl-4'-n-heptyl-ONN—azoxybenzene |
| 19 | trans-4-butyl-4'-n-octyl-ONN—azoxybenzene |
| 20 | trans-4-n-pentyl-4'-ethyl-ONN—azoxybenzene |
| 21 | trans-4-n-pentyl-4'-propyl-ONN—azoxybenzene |
| 22 | trans-4-n-pentyl-4'-butyl-ONN—azoxybenzene |
| 23 | trans-4-n-pentyl-4'-hexyl-ONN—azoxybenzene |
| 24 | trans-4-n-pentyl-4'-heptyl-ONN—az$xybenzene |
| 25 | trans-4-n-pentyl-4'-octyl-ONN—azoxybenzene |
| 26 | trans-4-n-hexyl-4'-ethyl-ONN—azoxybenzene |
| 27 | trans-4-n-hexyl-4'-propyl-ONN—azoxybenzene |
| 28 | trans-4-n-hexyl-4'-butyl-ONN—azoxybenzene |
| 29 | trans-4-n-hexyl-4'-heptyl-ONN—azoxybenzene |
| 30 | trans-4-n-hexyl-4'-octyl-ONN—azoxybenzene |
| 31 | trans-4-n-heptyl-4'-ethyl-ONN—azoxybenzene |
| 32 | trans-4-n-heptyl-4'-propyl-ONN—azoxybenzene |
| 33 | trans-4-n-heptyl-4'-butyl-ONN—azoxybenzene |
| 34 | trans-4-n-heptyl-4'-pentyl-ONN—azoxybenzene |
| 35 | trans-4-n-heptyl-4'-hexyl-ONN—azoxybenzene |
| 36 | trans-4-n-heptyl-4'-octyl-ONN—azoxybenzene |
| 37 | trans-4-n-octyl-4'-ethyl-ONN—azoxybenzene |
| 38 | trans-4-n-octyl-4' -propyl-ONN—azoxybenzene |
| 39 | trans-4-n-octyl-4'-butyl-ONN—azoxybenzene |
| 40 | trans-4-n-octyl-4'-pentyl-ONN—azoxybenzene |
| 41 | trans-4-n-octyl-4'-hexyl-ONN—azoxybenzene |
| 42 | trans-4-n-octyl-4'-heptyl-ONN—azoxybenzene |

The infrared spectrum of each of the azoxybenzenes of Examples 3–42 are substantially as illustrated in FIGS. 2 and 3.

All the above azoxy compounds have the following general formula:

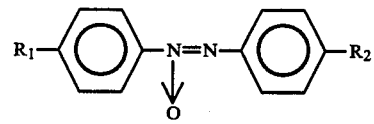

For the following seven azoxybenzene compounds shown in Table 4, C is the crystalline phase, N is the nematic phase and I is an isotropic phase.

TABLE 4

| Example | R1 | R2 | C N(C) | N I(C) |
| --- | --- | --- | --- | --- |
| 1 | n-C$_6$H$_{13}$ | n-C$_5$H$_{11}$ | 20.0 | 61.3 |
| 28 | n-C$_6$H$_{13}$ | n-C$_4$H$_9$ | 31.5 | 41.6 |
| 23 | n-C$_5$H$_{11}$ | n-C$_6$H$_{13}$ | 22.1 | 61.8 |
| 22 | n-C$_5$H$_{11}$ | n-C$_4$H$_9$ | 12.0 | 54.3 |
| 21 | n-C$_5$H$_{11}$ | n-C$_3$H$_7$ | 27.0 | 64.0 |
| 20 | n-C$_5$H$_{11}$ | n-C$_2$H$_5$ | 13.5 | 45.2 |
| 7 | n-C$_2$H$_5$ | n-C$_5$H$_{11}$ | 20.0 | 43.2 |

For the following 35 azoxybenzene compounds shown in Table 5, S is a smectic phase, N is a nematic phase and I is an isotropic liquid phase.

TABLE 5

| Example | R1 | R2 | mp (°C.) | S/N (°C.) | N → I (°C.) |
|---|---|---|---|---|---|
| 2 | $C_2H_5$ | $n-C_3H_9$ | 23.5 | | 35.4 |
| 3 | $C_2H_5$ | $n-C_4H_9$ | 23.0 | | (20.1) |
| 5 | $C_2H_5$ | $n-C_6H_{13}$ | 22.3 | | 33.0 |
| 6 | $C_2H_5$ | $n-C_7H_{15}$ | 18.5 | | 47.3 |
| 7 | $C_2H_5$ | $n-C_8H_{17}$ | 21.2 | 4.0 | 43.9 |
| 8 | $n-C_3H_9$ | $C_2H_5$ | 16.5 | | 33.8 |
| 9 | $n-C_3H_7$ | $n-C_4H_9$ | 48.8 | | (46.3) |
| 10 | $n-C_3H_7$ | $n-C_5H_{11}$ | 31.9 | | 62.8 |
| 11 | $n-C_3H_7$ | $n-C_6H_{13}$ | 34.2 | | 58.0 |
| 12 | $n-C_3H_7$ | $n-C_7H_{15}$ | 33.0 | | 64.5 |
| 13 | $n-C_3H_7$ | $n-C_8H_{17}$ | 33.4 | (6.2) | 68.2 |
| 14 | $n-C_4H_9$ | $C_2H_5$ | 16.2 | | 19.3 |
| 15 | $n-C_4H_9$ | $n-C_3H_7$ | 21.5 | | 47.0 |
| 16 | $n-C_4H_9$ | $n-C_5H_{11}$ | 16.1 | | 52.7 |
| 17 | $n-C_4H_9$ | $n-C_6H_{13}$ | 17.6 | (8.0) | 40.1 |
| 18 | $n-C_4H_9$ | $n-C_7H_{15}$ | 16.0 | 24.0 | 57.5 |
| 19 | $n-C_4H_9$ | $n-C_8H_{17}$ | 17.3 | 36.3 | 45.6 |
| 24 | $n-C_5H_{11}$ | $n-C_7H_{15}$ | 23.6 | | 69.4 |
| 25 | $n-C_5H_{11}$ | $n-C_8H_{17}$ | 22.5 | 47.5 | 67.8 |
| 26 | $n-C_6H_{13}$ | $C_2H_5$ | 14.5 | | 35.2 |
| 27 | $n-C_6H_{13}$ | $n-C_3H_7$ | 20.0 | | 58.7 |
| 29 | $n-C_6H_{13}$ | $n-C_7H_{15}$ | 21.0 | 47.1 | 63.0 |
| 30 | $n-C_6H_{13}$ | $n-C_8H_{17}$ | 21.8 | 50.0 | 53.4 |
| 31 | $n-C_7H_{15}$ | $C_2H_5$ | 11.3 | | 53.0 |
| 32 | $n-C_7H_{15}$ | $n-C_3H_9$ | 23.7 | | 67.3 |
| 33 | $n-C_7H_{15}$ | $n-C_4H_9$ | 30.4 | 40.5 | 58.6 |
| 34 | $n-C_7H_{15}$ | $n-C_5H_{11}$ | 21.4 | 44.6 | 70.3 |
| 35 | $n-C_7H_{15}$ | $n-C_6H_{13}$ | 41.3 | 50.8 | 63.4 |
| 36 | $n-C_7H_{15}$ | $n-C_8H_{17}$ | 45.3 | 61.2 | 66.7 |
| 37 | $n-C_8H_{17}$ | $C_2H_5$ | 14.7 | (10.0) | 43.0 |
| 38 | $n-C_8H_{17}$ | $n-C_3H_7$ | 19.4 | 35.0 | 68.8 |
| 39 | $n-C_8H_{17}$ | $n-C_4H_9$ | 31.5 | 44.7 | 54.5 |
| 40 | $n-C_8H_{17}$ | $n-C_5H_{11}$ | 50.8 20.5 | 68.4 | |
| 41 | $n-C_8H_{17}$ | $n-C_6H_{13}$ | 34.8 | 55.0 | 62.7 |
| 42 | $n-C_8H_{17}$ | $n-C_7H_{15}$ | 30.0 | 61.9 | 67.0 |

Liquid crystal compositions including the asymmetric azoxybenzene compounds in accordance with the invention were prepared as follows.

EXAMPLE 42

Two liquid crystal compositions of composition A based on symmetrical azoxybenzene compounds and composition B based on asymmetric azoxybenzene compounds in accordance with the invention were prepared as follows:

| compound | Weight percentage (Wt. %) |
|---|---|
| COMPOSITION A | |
| 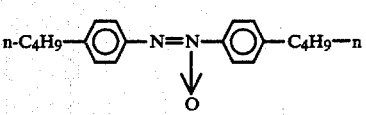 n-C$_4$H$_9$—⟨⟩—N=N(→O)—⟨⟩—C$_4$H$_9$-n | 21.9 |
| 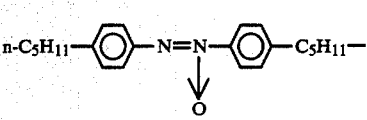 n-C$_5$H$_{11}$—⟨⟩—N=N(→O)—⟨⟩—C$_5$H$_{11}$-n | 27.9 |
| 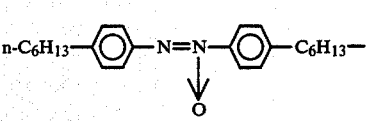 n-C$_6$H$_{13}$—⟨⟩—N=N(→O)—⟨⟩—C$_6$H$_{13}$-n | 30.2 |
| 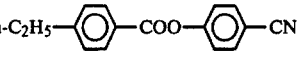 n-C$_2$H$_5$—⟨⟩—COO—⟨⟩—CN | 10.0 |
| 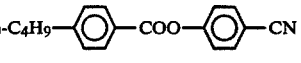 n-C$_4$H$_9$—⟨⟩—COO—⟨⟩—CN | 10.0 |
| 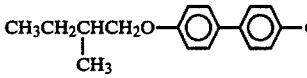 CH$_3$CH$_2$CH(CH$_3$)CH$_2$O—⟨⟩—⟨⟩—CN | 0.3 |
| | 100.3% |
| COMPOSITION B | |
|  n-C$_5$H$_{11}$—⟨⟩—N=N(→O)—⟨⟩—C$_4$H$_9$-n | 33.9 |
| 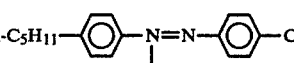 n-C$_5$H$_{11}$—⟨⟩—N=N(→O)—⟨⟩—C$_6$H$_{13}$-n | 22.3 |
| 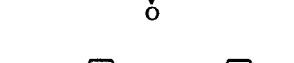 n-C$_6$H$_{13}$—⟨⟩—N=N(→O)—⟨⟩—C$_5$H$_{11}$-n | 23.8 |
| 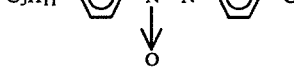 n-C$_2$H$_5$—⟨⟩—COO—⟨⟩—CN | 10.0 |
| 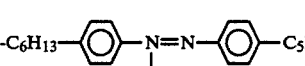 n-C$_4$H$_9$—⟨⟩—COO—⟨⟩—CN | 10.0 |
|  CH$_3$CH$_2$CH(CH$_3$)CH$_2$O—⟨⟩—⟨⟩—CN | 0.3 |
| | 100.3% |

In each case, the total weight percent amounted to 100.3%. The nematic liquid crystal temperature range of the liquid crystal Composition A wherein the basic material is symmetric azoxybenzene compounds is from −6.5° to 48.5° C. The range for liquid crystal Composition B wherein the basic material is asymmetric azoxy compounds in accordance with the invention is from −9.5° to 51.2° C. Thus, the liquid crystal compositions including azoxy compounds in accordance with the invention have a wider range of nematic liquid crystal temperatures than conventional compositions. Most significantly, in accordance with the invention, the lower limit of the liquid crystal temperature range is lower compared to conventional liquid crystal compositions including symmetric azoxy compounds.

With respect to both Composition A and Composition B, the voltage-contrast characteristics were examined in terms of the dynamic characteristics, α: visual angle dependence, β: steepness and the ratio γ:α·β. The results of the examination of both Composition A and Composition B are shown in the following Table 6 and Table 7, respectively.

The TN liquid crystal cell utilized included substrates wherein the surfaces were oriented by rubbing at an angle of 45° to the left hand and outer polarizing plates having a polarizing axis at an angle 55° to the left. The observations were performed after applying 1 KHz alternating voltage in dynamic driving mode at a temperature of 20° C.

TABLE 6

| thickness of cell (μm) | Composition A | | | |
|---|---|---|---|---|
| | α | β | γ | Vth(V') |
| 4.5 | 1.143 | 1.221 | 1.395 | 1.506 |
| 4.5 | 1.140 | 1.215 | 1.385 | 1.509 |
| 5.5 | 1.164 | 1.195 | 1.390 | 1.605 |
| 5.6 | 1.166 | 1.198 | 1.398 | 1.608 |
| 6.5 | 1.181 | 1.207 | 1.426 | 1.659 |
| 6.5 | 1.187 | 1.212 | 1.439 | 1.670 |

TABLE 7

| thickness of cell (μm) | Composition B | | | |
|---|---|---|---|---|
| | α | β | γ | Vth(V) |
| 4.4 | 1.155 | 1.208 | 1.395 | 1.529 |
| 4.4 | 1.155 | 1.202 | 1.389 | 1.539 |
| 5.6 | 1.172 | 1.196 | 1.402 | 1.620 |
| 5.6 | 1.169 | 1.185 | 1.386 | 1.631 |
| 6.5 | 1.179 | 1.203 | 1.418 | 1.653 |
| 6.6 | 1.188 | 1.207 | 1.433 | 1.668 |

EXAMPLE 44

The comparison of Example 43 was reproduced utilizing omposition A of Example 43 and new Composition C including asymmetric azoxy compound in accordance with the invention as follows:

COMPOSITION C

| compound | mixing rate (Wt %) |
|---|---|
| n-C$_4$H$_9$—⟨⟩—N=N(O)—⟨⟩—C$_5$H$_{11}$—n | 33.0 |
| n-C$_4$H$_9$—⟨⟩—N=N(O)—⟨⟩—C$_6$H$_{13}$—n | 25.0 |
| n-C$_5$H$_{11}$—⟨⟩—N=N(O)—⟨⟩—C$_7$H$_{15}$—n | 22.0 |
| C$_2$H$_5$—⟨⟩—COO—⟨⟩—CN | 10.0 |
| n-C$_4$H$_9$—⟨⟩—COO—⟨⟩—CN | 10.0 |

COMPOSITION C -continued

| compound | mixing rate (Wt %) |
|---|---|
| CH$_3$CH$_2$CH(CH$_3$)CH$_2$—O—⟨⟩—⟨⟩—CN | 0.3 |
| | 100.3 |

As reported in Example 43, Composition A having asymmetric azoxy basic material has a nematic liquid crystal temperature range of from −6.5° to 48.5° C. Composition C having a base material of the asymmetric azoxy compound in accordance with the invention has a nematic liquid crystal temperature range of from −7.5° to 54.5° C. The results of the examination of the dynamic characteristics under the conditions reported in Example 43 are set forth in Table 8.

TABLE 8

| Composition | Thickness of cell (μm) | α | β | γ | Vth(V) |
|---|---|---|---|---|---|
| A | 4.5 | 1.143 | 1.221 | 1.395 | 1.506 |
| | 5.5 | 1.164 | 1.195 | 1.390 | 1.605 |
| | 6.5 | 1.187 | 1.212 | 1.439 | 1.670 |
| C | 4.4 | 1.156 | 1.202 | 1.386 | 1.535 |
| | 5.6 | 1.169 | 1.184 | 1.384 | 1.629 |
| | 6.5 | 1.177 | 1.201 | 1.414 | 1.650 |

EXAMPLE 45

The following liquid crystal compositions, Composition D, Composition E and Composition F as follows were prepared and subjected to a light-resistivity test. Composition D included the following liquid crystal compounds:

COMPOSITION D

| compound | Weight percentage (Wt. %) |
|---|---|
| n-C$_4$H$_7$—⟨⟩—N=N(O)—⟨⟩—OCH$_3$ | 40 |
| n-C$_3$H$_7$—⟨⟩—N=N(O)—⟨⟩—OOC.C$_6$H$_{13}$—n | 40 |
| C$_2$H$_5$—⟨⟩—COO—⟨⟩—CN | 10 |
| n-C$_4$H$_9$—⟨⟩—COO—⟨⟩—CN | 10 |

Composition E in accordance with the invention included the following:

COMPOSITION E

| Structure | Weight percentage (Wt. %) |
|---|---|
| n-C$_5$H$_{11}$—⌬—N=N(→O)—⌬—C$_2$H$_5$-n | 40 |
| n-C$_5$H$_{11}$—⌬—N=N(→O)—⌬—C$_6$H$_{13}$-n | 40 |
| n-C$_2$H$_5$—⌬—COO—⌬—CN | 10 |
| n-C$_4$H$_9$—⌬—COO—⌬—CN | 10 |

Composition F in accordance with the invention was included the following:

COMPOSITION F

| Structure | Weight percentage (Wt. %) |
|---|---|
| n-C$_4$H$_9$—⌬—N=N(→O)—⌬—C$_2$H$_5$ | 40 |
| n-C$_3$H$_7$—⌬—N=N(→O)—⌬—C$_7$H$_{15}$-n | 40 |
| C$_2$H$_5$—⌬—COO—⌬—CN | 10 |
| n-C$_4$H$_9$—⌬—COO—⌬—CN | 10 |

The light-resistivity results are shown in the following Table 9:

TABLE 9

| Composition | Starting Value ($\Omega \cdot cm$) | After 360 H ($\Omega \cdot cm$) |
|---|---|---|
| D | $1.2 \times 10^{10}$ | $9.4 \times 10^7$ |
| E | $8.6 \times 10^{10}$ | $1.4 \times 10^9$ |
| F | $6.3 \times 10^{10}$ | $1.4 \times 10^9$ |

By including asymmetric 4-4'-dialkyl-ONN-azoxybenzene in a liquid crystal composition, the light-resistivity of the composition is reduced from ½ to ⅓ of conventional compositions, such as Composition D. Additionally, conventional Composition C turned red after 360 hours of use, whereas Composition D in accordance with the invention exhibited no change in color.

Figure 4:
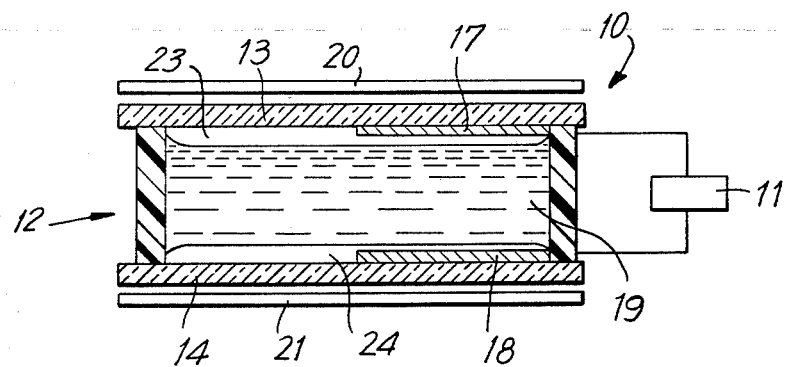
FIG. 4 is a cross-sectional view of a TN-liquid crystal display device with a liquid crystal composition including an asymmetric azoxybenzene in accordance with the invention.

FIG. 4 illustrates a typical liquid crystal display device 10 and includes a drive circuit 11 for applying drive signals to a liquid crystal cell 12. Cell 12 includes an upper substrate 15 and a lower substrate 14 spaced apart by a spacer 16. Each substrate 13 and 14 has electrodes 17 and 18 disposed on the interior surfaces thereof, respectively. Cell 12 also includes an upper polarizer 20 and a lower polarizer 21 in a transmissive device illustrated and may include a reflector on lower polarizer 21. A liquid crystal composition 19 including asymmetric azoxybenzene compounds prepared in accordance with the invention is disposed in the space between substrate 13 and 14. The interior surfaces of substrate 13 and 14 and electrodes 17 and 18 may be covered with a liquid crystal molecule orientation layer 22 and 23, respectively.

Signals are selectively applied to electrodes 17 and 18. The voltage drop between cooperating opposed electrodes cause the portion of the liquid crystal composition therebetween to be rendered visually distinguishable from the remainder of the liquid crystal composition in response to polarized light entering cell 12. At least one of electrodes 17 and 18 is transparent.

Figure 5:
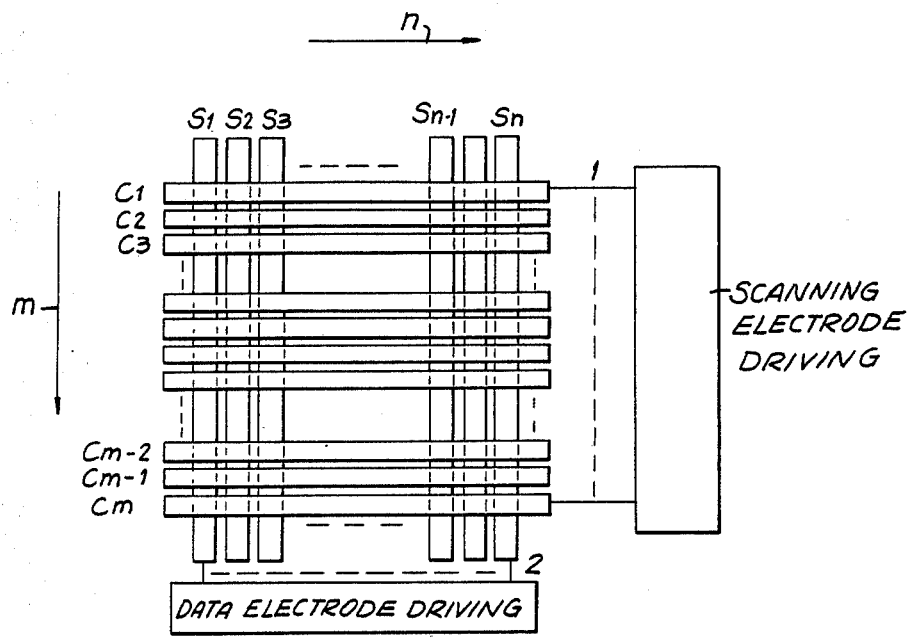
FIG. 5 is a block diagram of a matrix-addressing drive for a liquid crystal display device including an asymmetric trans-4-4'-dialkyl-ONN-azoxybenzene in accordance with the invention.

FIG. 5 illustrates an arrangement of picture element electrodes in a liquid crystal matrix panel in which the asymmetric azoxybenzene compounds in accordance with the invention are particularly well suited. Data lines $S_1$ to $S_n$ extend in vertical columns and are parallel to each other in a row direction N. Scanning lines $C_1$ to $C_n$ extend in a horizontal or row direction and are numbered in direction m of the columns. Thereby n×m picture element or pic pixels are formed where the scanning and data lines overlap in the usual manner. These electrodes are formed on one substrate of an enclosed liquid crystal display cell as illustrated in FIG. 4.

It will thus be seen that the objects set forth above, among those made apparent from the preceding description, are efficiently attained and, since certain changes may be made in carrying out the above method and in the composition set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

What is claimed is:

1. A substantially pure single position isomer of trans-4-4'-dialkyl-ONN-azoxybenzene having the general formula:

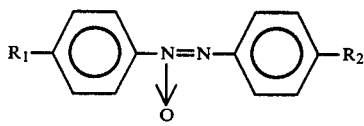

wherein $R_1$ and $R_2$ are straight-chain alkyl groups having from 1 to 10 carbon atoms and $R_1 \neq R_2$.

2. The azoxybenzene compound of claim 1 having the general formula:

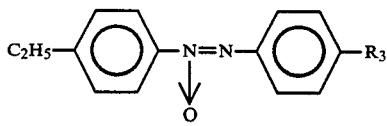

wherein $R_3$ is a straight-chain alkyl group having from 3 to 5 carbon atoms.

3. The azoxybenzene comopund of claim 1 having the general formula:

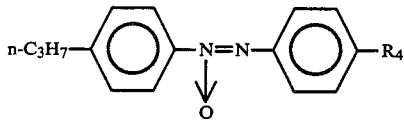

wherein $R_4$ is a straight-chain alkyl group having 2 or 4 to 8 carbon atoms.

4. The azoxybenzene compound of claim 1 having the general formula:

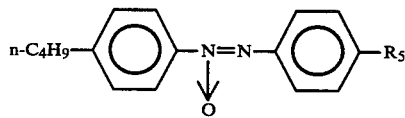

wherein $R_5$ is a straight-chain alkyl group having 2, 3 or 5 to 8 carbon atoms.

5. The azoxybenzene compound of claim 1 having the general formula:

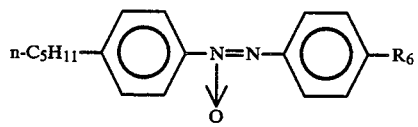

wherein $R_6$ is a straight-chain alkyl group having from 2 to 4 or 6 to 8 carbon atoms.

6. The azoxybenzene compound of claim 1 having the general formula:

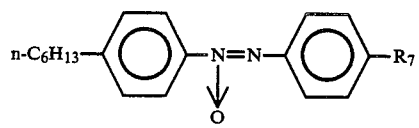

wherein $R_7$ is a straight-chain alkyl group having from 2 to 5, 7 or 8 carbon atoms.

7. The azoxybenzene compound of claim 1 having the general formula:

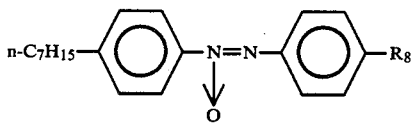

wherein $R_8$ is a straight-chain alkyl group having from 2 to 6 or 8 carbon atoms.

8. The azoxybenzene compound of claim 1 having the general formula:

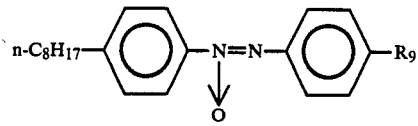

wherein $R_9$ is a straight-chain alkyl group having from 2 to 7 carbon atoms.

9. A liquid crystal display device, comprising two opposed substantially parallel substrates with liquid crystal electrodes selectively disposed on the interior surfaces thereof, liquid crystal composition in the space between the substrates, circuit means for generating signals to be selectively applied to the liquid crystal electrodes for rendering the liquid crystal composition between the electrodes visually distinguishable from the remaining liquid crystal composition, the liquid crystal composition comprising an effective amount of at least one substantially pure single position isomer of trans-4-4'-dialkyl-ONN-azoxybenzene having the general formula:

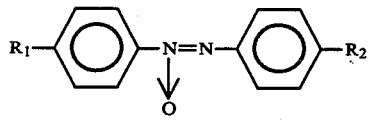

wherein $R_1$ and $R_2$ are straight-chain alkyl groups having from 1 to 10 carbon atoms and $R_1 \neq R_2$ for increasing the nematic temperature range of the liquid crystal composition.

10. The liquid crystal display device of claim 9, wherein the liquid crystal electrodes disposed on the interior surface of one of the substrates is arranged in a matrix array of columns and rows and the circuit means includes means for addressing the matrix array.

11. A liquid crystal composition including at least an effective amount of a substantially pure single position isomer of trans-4-4'-dialkyl-ONN-azoxybenzene having the general formula:

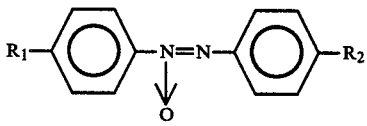

wherein $R_1$ and $R_2$ are straight-chain alkyl groups having from 1 to 10 carbon atoms and $R_1 \neq R_2$, for increasing the nematic temperature range of the liquid crystal composition.

12. The liquid crystal composition of claim 11, wherein each $R_1$ and $R_2$ contain from 4 to 6 carbon atoms.

13. The liquid crystal composition of claim 11, wherein the composition includes:

| compound | Weight percentage (Wt %) |
|---|---|
| n-C$_5$H$_{11}$—⌬—N=N(O)—⌬—C$_4$H$_9$-n | 33.9 |
| n-C$_5$H$_{11}$—⌬—N=N(O)—⌬—C$_6$H$_{13}$-n | 22.3 |
| n-C$_6$H$_{13}$—⌬—N=N(O)—⌬—C$_5$H$_{11}$-n | 23.8 |
| n-C$_2$H$_5$—⌬—COO—⌬—CN | 10.0 |
| n-C$_4$H$_9$—⌬—COO—⌬—CN | 10.0 |
| CH$_3$CH$_2$CHCH$_2$O—⌬—⌬—CN (with CH$_3$ branch) | 0.3 |
| | 100.3% |

14. The liquid crystal composition of claim 11, wherein the composition includes:

| compound | mixing rate (Wt %) |
|---|---|
| n-C$_4$H$_9$—⌬—N=N(O)—⌬—C$_5$H$_{11}$-n | 33.0 |
| n-C$_4$H$_9$—⌬—N=N(O)—⌬—C$_6$H$_{13}$-n | 25.0 |
| n-C$_5$H$_{11}$—⌬—N=N(O)—⌬—C$_7$H$_{15}$-n | 22.0 |
| C$_2$H$_5$—⌬—COO—⌬—CN | 10.0 |
| n-C$_4$H$_9$—⌬—COO—⌬—CN | 10.0 |
| CH$_3$CH$_2$CHCH$_2$—O—⌬—⌬—CN (with CH$_3$ branch) | 0.3 |
| | 100.3 |

15. The liquid crystal composition of claim 11, wherein the composition includes:

| compound | Weight percentage (Wt. %) |
|---|---|
| n-C$_5$H$_{11}$—⌬—N=N(O)—⌬—C$_2$H$_5$-n | 40 |
| n-C$_5$H$_{11}$—⌬—N=N(O)—⌬—C$_6$H$_{13}$-n | 40 |
| n-C$_2$H$_5$—⌬—COO—⌬—CN | 10 |
| n-C$_4$H$_9$—⌬—COO—⌬—CN | 10 |

16. The liquid crystal composition of claim 11, wherein the composition includes:

| compound | Weight percentage (Wt. %) |
|---|---|
| n-C$_4$H$_9$—⌬—N=N(O)—⌬—C$_2$H$_5$ | 40 |
| n-C$_3$H$_7$—⌬—N=N(O)—⌬—C$_7$H$_{15}$-n | 40 |
| C$_2$H$_5$—⌬—COO—⌬—CN | 10 |
| n-C$_4$H$_9$—⌬—COO—⌬—CN | 10 |

17. The liquid crystal display device of claim 9, wherein the liquid crystal composition comprises:

| compound | Weight percentage (Wt %) |
|---|---|
| n-C$_5$H$_{11}$—⌬—N=N(O)—⌬—C$_4$H$_9$-n | 33.9 |

-continued

| compound | Weight percentage (Wt %) |
|---|---|
| n-C$_5$H$_{11}$—⟨⟩—N=N—⟨⟩—C$_6$H$_{13}$-n ↓ O | 22.3 |
| n-C$_6$H$_{13}$—⟨⟩—N=N—⟨⟩—C$_5$H$_{11}$-n ↓ O | 23.8 |
| n-C$_2$H$_5$—⟨⟩—COO—⟨⟩—CN | 10.0 |
| n-C$_4$H$_9$—⟨⟩—COO—⟨⟩—CN | 10.0 |
| CH$_3$CH$_2$CH(CH$_3$)CH$_2$O—⟨⟩—⟨⟩—CN | 0.3 |
| | 100.3% |

18. The liquid crystal display device of claim 9, wherein the liquid crystal composition comprises:

| compound | mixing rate (Wt %) |
|---|---|
| n-C$_4$H$_9$—⟨⟩—N=N—⟨⟩—C$_5$H$_{11}$-n ↓ O | 33.0 |
| n-C$_4$H$_9$—⟨⟩—N=N—⟨⟩—C$_6$H$_{13}$-n ↓ O | 25.0 |
| n-C$_5$H$_{11}$—⟨⟩—N=N—⟨⟩—C$_7$H$_{15}$-n ↓ O | 22.0 |
| C$_2$H$_5$—⟨⟩—COO—⟨⟩—CN | 10.0 |
| n-C$_4$H$_9$—⟨⟩—COO—⟨⟩—CN | 10.0 |

| compound | mixing rate (Wt %) |
|---|---|
| CH$_3$CH$_2$CH(CH$_3$)CH$_2$—O—⟨⟩—⟨⟩—CN | 0.3 |
| | 100.3 |

19. The liquid crystal display device of claim 9, wherein the liquid crystal composition comprises:

| compound | Weight percentage (Wt. %) |
|---|---|
| n-C$_5$H$_{11}$—⟨⟩—N=N—⟨⟩—C$_2$H$_5$-n ↓ O | 40 |
| n-C$_5$H$_{11}$—⟨⟩—N=N—⟨⟩—C$_6$H$_{13}$-n ↓ O | 40 |
| n-C$_2$H$_5$—⟨⟩—COO—⟨⟩—CN | 10 |
| n-C$_4$H$_9$—⟨⟩—COO—⟨⟩—CN | 10 |

20. The liquid crystal display device of claim 9, wherein the liquid crystal composition comprises:

| compound | Weight percentage (Wt. %) |
|---|---|
| n-C$_4$H$_9$—⟨⟩—N=N—⟨⟩—C$_2$H$_5$ ↓ O | 40 |
| n-C$_3$H$_7$—⟨⟩—N=N—⟨⟩—C$_7$H$_{15}$-n ↓ O | 40 |
| C$_2$H$_5$—⟨⟩—COO—⟨⟩—CN | 10 |
| n-C$_4$H$_9$—⟨⟩—COO—⟨⟩—CN | 10 |

* * * * *